United States Patent Office 3,542,584
Patented Nov. 24, 1970

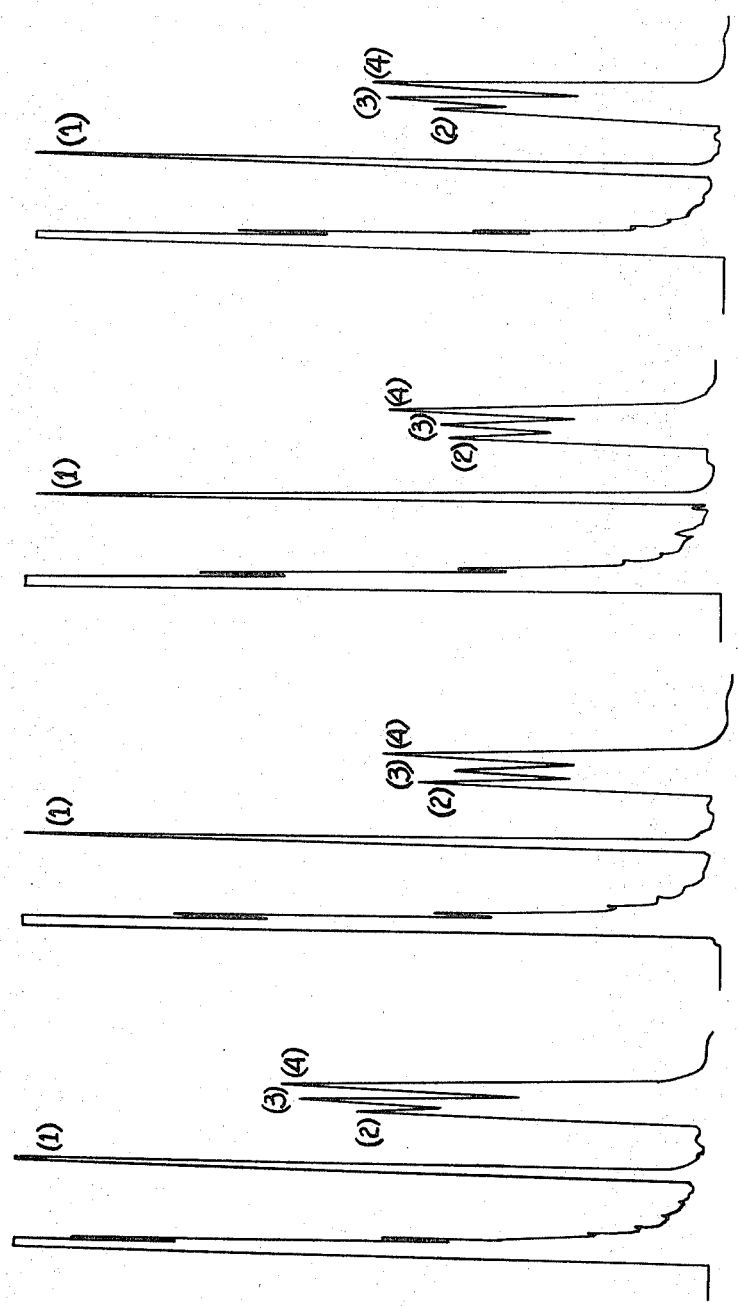

3,542,584
CHROMATOGRAPHIC SUPPORT
Daniel Marvin Ottenstein, Somerville, N.J., assignor to Johns-Manville Corporation, New York, N.Y., a corporation of New York
Filed Dec. 27, 1966, Ser. No. 604,898
Int. Cl. B44d 1/20
U.S. Cl. 117—54
8 Claims

ABSTRACT OF THE DISCLOSURE

A chromatographic packing material and support therefor made of acid-washed, silanized, low surface area diatomaceous silica, heat treated at a temperature of 325° C. for a period of time ranging between 0.5–6.0 hours.

This invention relates to chromatographic columns and more particularly to a novel chromatographic column packing and support therefor, as well as a novel method for making the same. The instant invention finds wide applicability especially in the field of gas chromatographic techniques in the isolation and identification of substances of a biochemical or biological nature.

It has long been recognized that there exists a need for a column packing and the support therefor which is essentially inert with respect to the substance being analyzed. In other words, the column packing, i.e., a support provided with a liquid phase, should not foster interaction with the substance being analyzed. Otherwise, such interaction results in an adsorption of a significant portion of the sample on the packing, thus causing chromatographic peaks that are asymmetrical, more commonly referred to as peak tailing.

Of the materials which have achieved acceptance as chromatographic supports in the preparation of column packings, the diatomite-based materials have been the most successful. The principal difficulty, however, with diatomite supports lies in the surface silanol groups, which groups can hydrogen bond with substances being analyzed. These substances are generally of the type such as alcohols, ketones and esters. This interaction between the support and the substance being analyzed has directed the efforts of earlier workers to modify the basic support material in the hope of eliminating this disadvantageous phenomenon.

These efforts have resulted in known modified diatomaceous supports, which have been produced by removing surface inorganic impurities from the basic support material by washing the basic support material with acid, followed by reacting surface silanol groups with organic silane compositions, e.g., dimethyldichlorosilane, and finally by coating this acid-washed, silanized support with a liquid phase to provide a column packing material.

Notwithstanding these measures, it has been found that during the course of operating a column filled with a packing material, made in accordance with such procedures, the column initially shows a loss of sample. Efforts to overcome such a disadvantage have led workers to "condition" the packed column prior to utilizing it in their studies. This "conditioning" technique often consists of permitting the column, filled with the packing material, to remain at or above normal operating temperatures for extensive periods of time. Such "conditioning" procedures are designed to reduce the adsorptive characteristics of the packing material and to eliminate the relatively low boiling fraction of the liquid phase from the column itself.

Specifically, known "conditioning" techniques involve operating the column for several days under normal conditions, i.e., in the absence of a molecular oxygen containing gas, e.g., air, and at a temperature of approximately 250° C. with a flow of inert carrier gas. Alternatively, where a conventional packing material provided with a liquid phase which will tolerate a higher temperature is employed, "conditioning" is effected by heating the packed column to a temperature of about 325° C. for a relatively short period of time in the absence of any carrier gas flow. Such "conditioning" techniques have been found particularly necessary when the column is to be used for biochemical or biological studies involving the isolation and/or identification of such substances as steroids, for instance, cholesterol, especially when such substances are present in the sample being analyzed in amounts in the microgram and submicrogram range. While the exact mechanism involved in such "conditioning" procedures to reduce the adsorptive characteristics of the packing material is not generally understood it has been suggested that during this "conditioning" period there is a redistribution or cross-linking of the liquid phase on the support, thus covering available adsorptive sites and, in effect, deactivating the support.

It will be readily apparent that such "conditioning" procedures suffer from a number of disadvantages. Foremost is the downtime involved. Chromatographic equipment is quite expensive and the time lost in "conditioning" the column obviously occasions a significant increase in operating costs.

It is therefore a principal object of this invention to provide a chromatographic packing material as well as a support therefor which exhibits a high degree of inertness with respect to a substance being analyzed and which substantially reduces or eliminates the need for conventional "conditioning" periods prior to use.

It is a further object of this invention to provide an improved method for making a chromatographic column packing material and a support therefor which is particularly adapted for use in gas chromatograph techniques in the isolation and identification of biochemical or biological substances.

Other objects and applications of the invention may become apparent from a study of this specification, drawings, and appended claims in which the various novel features of the invention are more particularly set forth.

It should be understood, however, that the detailed description, while indicating preferred embodiments of the invention, is given by way of illustration only since certain changes and modifications within the spirit of the invention will become apparent to those skilled in the art.

In the drawings, FIG. 1 is a chromatogram of a sample analyzed in a gas chromatographic column filled with a packing material made in accordance with this invention;

FIG. 2 is a chromatogram of a sample, essentially the same as that used to obtain the chromatogram shown in FIG. 1, which was analyzed in a gas chromatographic column filled with a conventional packing material which was not "conditioned" prior to analysis;

FIG. 3 is a chromatogram of a sample, essentially the same as that used to obtain the chromatogram of FIG. 1, which was analyzed in a gas chromatographic column filled with a conventional packing material that had been "conditioned," prior to analysis, at a temperature of 250° C. for 15 hours; and FIG. 4 is a chromatogram of a sample, essentially the same as that used to obtain the chromatogram of FIG. 1, which was analyzed in a gas chromatographic column filled with a conventional packing material that had been "conditioned," prior to analysis, at a temperature of 325° C. in an inert and quiescent atmosphere.

The objects of this invention are accomplished by heating an acid-washed, silane-treated diatomite support at an elevated temperature for a time sufficient to substantially reduce the adsorption sites thereof prior to coating said support with a liquid phase. The heat treatment employed comprises subjecting said acid-washed, silane-treated diatomite support to a temperature of approximately 325° C. for a period of time ranging from 0.5 to 6.0 hours.

The diatomite support initially consists essentially of diatomaceous silica having a particle size ranging from about 60 to 120 mesh although other particle sizes, of course, are contemplated. The diatomaceous silica exhibits a relatively low surface area in the order of about 0.7–0.1 m.$^2$/cc., preferably about 0.4–0.2 m.$^2$/cc. with an optimum value of about 0.3 m.$^2$/cc. as measured by the conventional BET method. Representative suitable diatomite supports useable in the instant invention are commercially available under the trademarks "Chromosorb" W and Chromosorb" G. These diatomite supports have a particle size as described above, a surface area of 0.29 m.$^2$/cc. and a free fall density of 0.18 and 0.49, respectively. It will be obvious, however, that there is also contemplated within the spirit of this invention the use of other available diatomaceous silicas which compare favorably with those designated above. It has been found that diatomaceous silica can be modified for use as initial support material in this invention by calcining, preferably with a flux, at conventional operating conditions to achieve a white diatomaceous silica having desirable relatively low surface area and density characteristics.

To transform the selected diatomaceous silica having characteristics as just described into the noval support of this invention, the diatomaceous silica is washed with a mineral acid, preferably, HCl having a concentration of about 1.0 N or greater for a period of time sufficient to remove deleterious inorganic substituents, such as the iron or other acid-soluble values thereof. It has been found convenient, for instance, to soak the raw, diatomaceous silica in 1 N HCl for about one hour and thereafter to rinse the diatomite with water. This washing-rinsing sequence can be repeated as often as desired although generally two such cycles have been found sufficient.

After thoroughly washing the raw diatomite with an acid and drying it, it is treated with a silanizing compound to effect a reaction or neutralization of the silanol groups present on the surface of the acid-washed diatomaceous silica, generally in accordance with conventional procedures. Thus, for instance, such conventional silanizing compounds as dimethyldichlorosilane can be employed, although the use of any other conventional or acceptable silanizing compound is contemplated. Preferably, the diatomaceous silica is intimately contacted with about 1 to 5 weight percent of silanizing compound based on the weight of the diatomaceous silica for a period of time ranging from about 0.5 to 24 hours or longer at a temperature ranging from ambient temperature to about 100° C. Obviously, the choice of any particular time or temperature will be dependent on a number of factors easily determined by those skilled in the art, the important consideration being that substantially all of the surface silanol groups are reacted or neutralized.

Following the silanizing treatment, the diatomaceous silica is washed with a low molecular weight alcohol, preferably methanol to remove any HCl formed during the silanizing treatment.

After thoroughly acid washing and silanizing the diatomaceous silica as described above, it is heated to a temperature of 325° C. for a period ranging from 0.5 to 6 hours to provide the novel chromatographic support material of this invention. This novel support material, adaptable to be coated with any desirable liquid phase, substantially eliminates the need of conventionally required "conditioning" procedures employed with heretofore known support materials, which are coated with a liquid phase without having been heat treated prior to such coating procedures.

Representative of suitable liquid phase materials useable in the instant invention, to coat the acid-washed, silanized, heat treated diatomite support are SE–30 silicone gum, SE–52, QF–1, etc.

The liquid phase can be applied to the novel support material of this invention by any convenient means such as by conventional solution-evaporation or solution-coating methods. Generally the coating will be present on the support in amounts ranging between about 0.1 and 15.0 weight percent of the total.

The following examples illustrate the preparation of the novel chromatographic support and packing material of this invention and the method for making the same, as well as the surprisingly advantageous results attainable when compared to prior art materials and their method of manufacture.

A master batch of acid-washed, silanized diatomite ("Chromosorb" W) was prepared in accordance with the procedures outlined above, employing 1 N HCl to acid wash the diatomite and dimethyldichlorosilane, as a silanizing agent, to neutralize the silanol groups on the surface thereof.

EXAMPLE 1

A 3-gram portion of the acid-washed, silanized diatomite was heated at a temperature of approximately 325° C. for 6 hours in a conventional oven. Thereafter, the heat-treated diatomite support was coated with SE–30 silicone gum by conventionl solution coating techniques from a 3 weight percent solution of methylene chloride to provide a novel packing material of this invention. This novel packing material was introduced into a glass column, which when installed in a gas chromatograph, equipped with a flame ionization detector, was heated to 250° C., with a flow of helium carrier gas.

To demonstrate the effectiveness of the novel packing material of this invention a test solution containing cholestane, cholestanol methyl ether, cholesterol and cholestan-3-one, each in amounts of 1 microgram/cc. of toluene solvent was prepared. One microliter of the test solution was introduced into the column by means of a 10-microliter capacity syringe. FIG. 1 of the accompanying drawings shows the resulting chromatograph wherein peak No. 3 represents cholesterol which was selected to be observed because it graphically illustrates that heat treating the acid-washed, silanized diatomite support prior to coating with a liquid phase effectively minimizes its loss occasioned by substantial adsorption on the packing material.

EXAMPLE 2

A second 3-gram portion of the acid-washed, silanized diatomite was coated with SE–30 silicone gum, as above, but without heat treating the acid-washed, silanized diatomite. This packing material was then introduced into a glass column of the gas chromatograph equipment described in Example 1 and heated to 250° C. with a flow of carrier gas therethrough. A second one-microliter portion of the above described test sample was introduced into the column in the same manner as described above. FIG. 2 of the accompanying drawings shows the resulting chromatograph. It will be observed that the cholesterol peak No. 3 shows a lower peak height compared with cholestanol methyl ether peak No. 2. The drop in peak height of cholesterol, compared to the cholestanol methyl ether indicates a loss of the cholesterol in the column.

EXAMPLE 3

A third 3-gram portion of the acid-washed, silanized diatomite was coated as described in Example 2 and, again, without having been heat treated in the manner shown in Example 1. The resulting packing material was introduced into essentially the same glass column of the gas chromatograph equipment as described above. However, before introducing the test sample mixture therein, the column was "conditioned" in accordance with conventional procedures by heating the same to 250° C. overnight, i.e., about 15 hours, with a flow of carrier gas, such as helium, therethrough. Thereafter a third one-microliter portion of the above described cholesterol-containing sample was introduced into the column. FIG. 3 of the accompanying drawings shows the resulting chromatograph. It will be observed that cholesterol peak No. 3 shows an improvement relative to that of the cholestanol methyl ether peak No. 2 when compared to the results shown in FIG. 2. More important, however is the fact that this peak height is significantly lower than that obtained in FIG. 1.

EXAMPLE 4

A fourth 3-gram portion of the acid-washed, silanized diatomite master batch was coated, as before, with SE-30 silicone gum without the heat treatment as set forth in Example 1. The resulting packing material was placed in the column and "conditioned" in accordance with another conventional procedure by heating the packed column to 325° C. without a flow of carrier gas for one hour. After this "conditioning" period, the temperature was reduced to normal operating temperature, i.e., approximately 250° C. A fourth one-microliter portion of the above-described cholesterol-containing sample was introduced into the column in essentially the same manner as described before. FIG. 4 of the accompanying drawings shows the resulting chromatograph. It can be observed that the height of cholesterol peak No. 3 and its relation to the cholestanol methyl ether peak No. 2 is improved as contrasted to the corresponding cholesterol peak heights shown in FIG. 2 or FIG. 3.

It will be observed that the relative height of the cholesterol peak in the chromatogram of FIG. 4 is substantially comparable to the relative height of the cholesterol peak obtained when using packing material made in accordance with the novel concepts of this invention, as shown in the chromatogram of FIG. 1. Surprisingly, however, these favorable results are attainable in accordance with the present invention and in contrast with the procedure described in connection with Examples 2, 3, and 4, by the expedient of heat treating as in conventional ovens, the acid-washed, silanized diatomite support without first coating the support with a liquid phase and without the necessity of thereafter substantially conditioning the support under special and complex environmental conditions as obtained in the column itself. It will be appreciated that it is undesirable to tie up, for conditioning operations, the expensive analytical apparatus which includes the column. Thus, since it is unnecessary to maintain special environmental conditions in the heat treating step of the present invention, conventional heat treating apparatus, such as conventional ovens, can be used for that purpose. This makes possible full and efficient use of the gas chromatography equipment for analysis work and substantially eliminates downtime of the equipment for purposes of conditioning the packing. Considering the expense of such equipment, this feature alone fulfills a long-felt need not heretofore satisfied. It will also be appreciated that certain limitations are attendant with heating a support that has been coated with a liquid phase, as was previously thought necessary, prior to the heating, which typically has taken place in the column itself. For instance, such heating procedures, of necessity, must be conducted in the absence of air or any other molecular oxygen containing gas to avoid degradation of the coating itself. It should also be noted that a significant number of such coatings cannot withstand exposure to temperatures in the range of 325° C. without substantial degradation. Moreover, even in the relatively few instances where the coating material is not materially degraded by temperatures such as it is desirable to use, it will be appreciated that this in situ heating procedure can be conducted only on a relatively miniscule scale involving the use of expensive equipment designed primarily for a totally different function with the necessity of maintaining the ambient atmosphere inert during the lengthy "conditioning" period.

It is believed that the foregoing description not only provides a complete description of the invention in such a manner as to distinguish it from other inventions and from what is old but also provides a description of the best mode contemplated of carrying out the invention.

It is to be understood that variations and modifications of the invention, as illustrated by the specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What I claim is:

1. A process for producing a diatomaceous silica support material adapted to receive a liquid phase for use in chromatographic separation, said process comprising:
   (a) washing the support material with a mineral acid,
   (b) contacting the support material with a silanizing compound to effect a neutralization of substantially all surface silanol groups, and
   (c) heating the siliceous support, uncoated with the liquid phase, at an elevated temperature and for a sufficient time to deactivate the support material and prepare it for coating with the liquid phase.

2. A method in accordance with claim 1, wherein any acid formed during the silanizing treatment is washed from the support material prior to the heating step.

3. A method in accordance with claim 1, wherein said acid washed, silanized support material is heated in the absence of the liquid phase at a temperature of about 325° C. for a period of time within the approximate range of .5–6.0 hours.

4. A method in accordance with claim 1, wherein said support material has a surface area within the approximate range of 0.7–0.1 m.²/cc.

5. A method in accordance with claim 1, wherein said support material has a surface area within the approximate range of 0.4–0.2 m.²/cc.

6. A support material made in accordance with a method as defined in claim 1.

7. A process for producing a diatomaceous silica support material adapted to receive a liquid phase coating for use in chromatographic separation, said process comprising:
   (a) washing the support material with a mineral acid,
   (b) contacting the support material with a silanizing compound to effect a neutralization of substantially all surface silanol groups,
   (c) heating the silica support at an elevated temperature and for a sufficient time to deactivate the support material, and
(d) coating the support material with said liquid phase.

8. A diatomaceous silica support made in accordance with a method as defined in claim 7.

References Cited

UNITED STATES PATENTS

| | | | |
|---|---|---|---|
| 2,315,328 | 3/1943 | Hood et al. | 117—54 |
| 2,968,578 | 1/1961 | Mochel | 117—54 |
| 3,285,701 | 11/1966 | Robertson | 55—67 |

OTHER REFERENCES

Schwartz, G. G.: "Improving Photoresist Adhesion To Hydrophilic Surfaces," in IBM "Technical Disclosure Bulletin," vol. 9, No. 1, June 1966, p. 10.

ALFRED L. LEAVITT, Primary Examiner

J. A. BELL, Assistant Examiner

U.S. Cl. X.R.

117—69, 72, 123; 55—67